United States Patent
Wu et al.

(10) Patent No.: US 8,034,457 B2
(45) Date of Patent: Oct. 11, 2011

(54) SEAL STRUCTURE AND ASSOCIATED METHOD

(76) Inventors: Jian Wu, Fremont, CA (US); Dong-Sil Park, Niskayuna, NY (US); Craig Stringer, DuBois, PA (US); Sundeep Kumar, Bangalore (IN)

( * ) Notice: Subject to any disclaimer, the term of this patent is extended or adjusted under 35 U.S.C. 154(b) by 289 days.

(21) Appl. No.: 12/270,247

(22) Filed: Nov. 13, 2008

(65) Prior Publication Data

US 2010/0119847 A1    May 13, 2010

(51) Int. Cl.
*B32B 17/06* (2006.01)
*C03C 8/00* (2006.01)

(52) U.S. Cl. ............ 428/428; 428/688; 501/14; 501/15; 501/17; 501/21; 501/55; 501/65; 501/66; 501/68

(58) Field of Classification Search .................... 501/14, 501/15, 17, 21, 55, 65, 66, 68
See application file for complete search history.

(56) References Cited

U.S. PATENT DOCUMENTS

| 4,268,313 | A | | 5/1981 | Park et al. | |
|---|---|---|---|---|---|
| 4,349,635 | A | * | 9/1982 | Davis et al. | 501/15 |
| 5,194,337 | A | | 3/1993 | Yoshida et al. | |
| 5,380,596 | A | | 1/1995 | Yoshida et al. | |

FOREIGN PATENT DOCUMENTS

EP    0729923 B1    8/1999

* cited by examiner

*Primary Examiner* — Gwendolyn Blackwell
(74) *Attorney, Agent, or Firm* — Joseph J. Christian

(57) ABSTRACT

A seal structure is provided for an energy storage device. The seal structure includes a sealing glass joining an ion-conducting first ceramic to an electrically insulating second ceramic. The sealing glass has a composition that includes about 48 weight percent silica, about 20 weight percent to about 25 weight percent boria, about 20 weight percent to about 24 weight percent alumina, and about 8 weight percent to about 12 weight percent sodium oxide based on the total weight of the sealing glass composition. A method for making the seal structure is provided. An article comprising the seal structure is also provided.

22 Claims, 1 Drawing Sheet

SEAL STRUCTURE AND ASSOCIATED METHOD

BACKGROUND

1. Technical Field

The invention includes embodiments that relate to a seal structure for an energy storage device. The invention includes embodiments that relate to a sealing material to be used in the seal structure of an energy storage device. The invention includes embodiments that relate to a method of sealing an energy storage device.

2. Discussion of Related Art

Development work has been undertaken on high temperature rechargeable batteries using sodium for the negative electrode. The liquid sodium negative electrode is separated from a positive electrode by a sodium-ion conducting solid electrolyte. Suitable material includes beta-alumina and beta"-alumina, known together as beta alumina solid electrolyte (BASE), which is used as the separator of electrodes. Some electrochemical cells have a metallic casing. The ceramic parts of the cell can be joined or bonded via a sealing material. The sealing material may include a glassy material having undesirable characteristics associated with its use. Bonded ceramic parts formed from dissimilar materials in a high temperature cell may crack due to thermal stress caused by mismatch in the coefficient of thermal expansion. The coefficient of thermal expansion for two ceramic parts can be substantially dissimilar. The sealing material may have a limited life, and bond failure or degradation may cause cell failure due to a direct conduction path between the cathode and anode electrodes.

It may be desirable to have a sealing material for an energy storage device that differs from those sealing materials that are currently available. It may be desirable to have a seal structure that differs from those seal structures that are currently available. It may be desirable to have a method of sealing an energy storage device that differs from those methods that are currently available.

BRIEF DESCRIPTION

In accordance with an embodiment of the invention, a seal structure is provided for an energy storage device. The seal structure includes a sealing glass joining an ion-conducting first ceramic to an electrically insulating second ceramic. The sealing glass has a composition that includes about 48 weight percent silica, about 20 weight percent to about 25 weight percent boria, about 20 weight percent to about 24 weight percent alumina, and about 8 weight percent to about 12 weight percent sodium oxide based on the total weight of the sealing glass composition.

In accordance with an embodiment of the invention, a method is provided that is capable of forming a seal structure for an energy storage device. The seal structure includes a sealing glass. The method includes mixing about 48 weight percent silica, about 20 weight percent to about 25 weight percent boria, about 20 weight percent to about 24 weight percent alumina, and about 8 weight percent to about 12 weight percent sodium oxide based on the total weight of a sealing glass composition, balancing the amount of alumina relative to the amount of sodium oxide, and controlling the amount of sodium oxide to form the sealing glass composition.

In accordance with an embodiment of the invention, an article is provided that includes a seal structure for use in an energy storage device. The article includes an ion-conducting first ceramic and an electrically insulating second ceramic connected by a seal structure. The seal structure includes a sealing glass. The sealing glass has a composition that includes about 48 weight percent silica, about 20 weight percent to about 25 weight percent boria, about 20 weight percent to about 24 weight percent alumina, and about 8 weight percent to about 12 weight percent sodium oxide.

DETAILED DESCRIPTION

Figure 1:
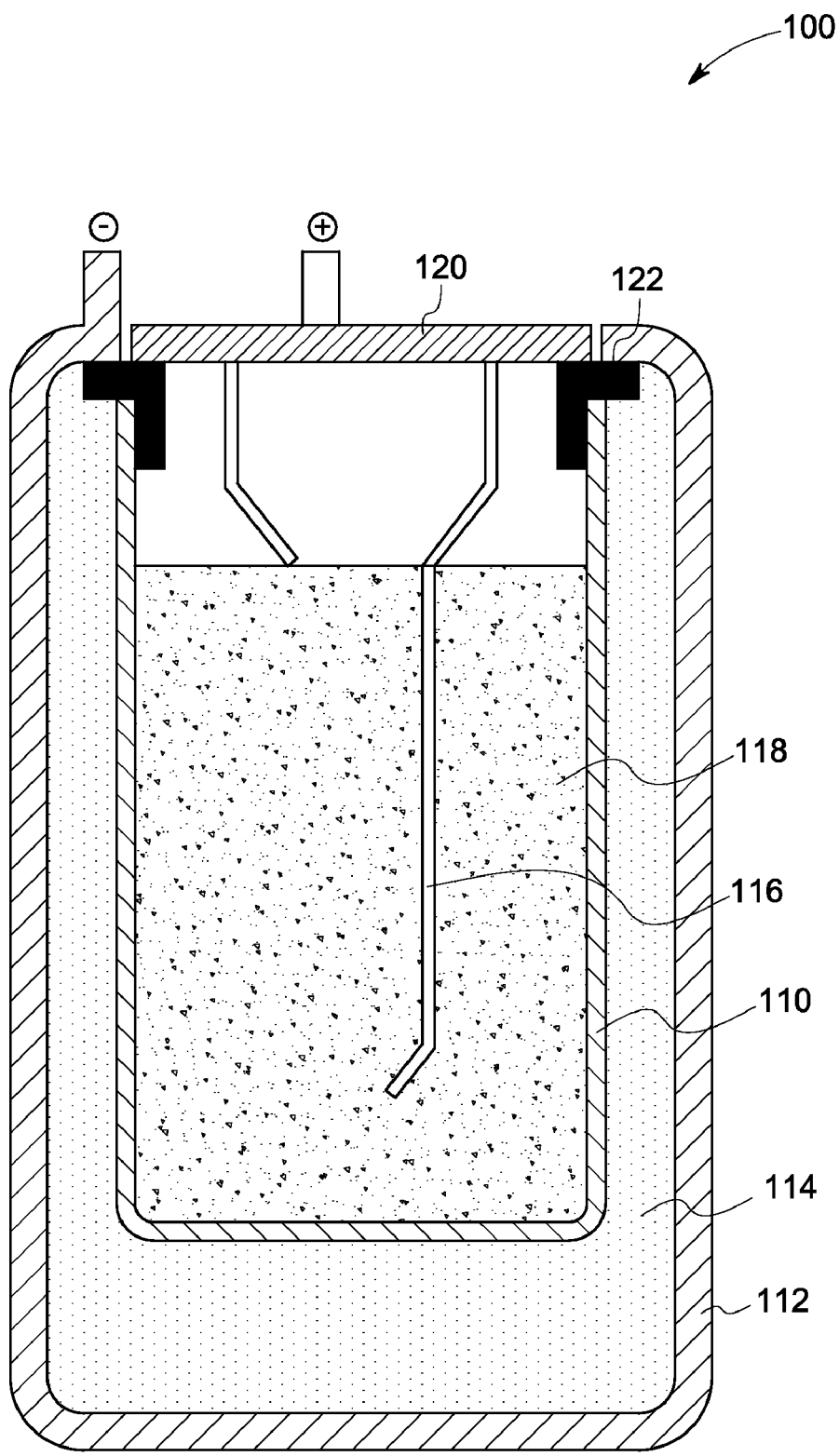
FIG. 1 is a schematic view showing a seal structure in accordance with one embodiment of the invention.

The invention includes embodiments that relate to a seal structure for an energy storage device. The invention includes embodiments that relate to a sealing material for an energy storage device. The invention includes embodiments that relate to a method of sealing an electrochemical cell.

As used herein, cathodic material is the material that supplies electrons during charge and is present as part of a redox reaction. Anodic material accepts electrons during charge and is present as part of the redox reaction. A monolith is a single block or piece, as distinguished from a part made by fusing or bonding multiple parts together.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

In accordance with an embodiment of the invention, a seal structure is provided for an energy storage device. The seal structure includes a sealing glass joining an ion-conducting first ceramic to an electrically insulating second ceramic. In one embodiment, the sealing glass comprises an amorphous, a crystalline, or a mixed metal oxide material. The sealing glass has a composition that includes about 48 weight percent silica, about 20 weight percent to about 25 weight percent boria, about 20 weight percent to about 24 weight percent alumina, and about 8 weight percent to about 12 weight percent sodium oxide based on the total weight of the sealing glass composition. The sealing glass compositions of the present invention makes it possible to construct a high power density or high energy density battery with long life time.

In one embodiment, the sealing glass composition comprises about 20 weight percent to about 22 weight percent alumina based on the total weight of the sealing glass composition. In one embodiment, the sealing glass composition comprises about 22 weight percent to about 24 weight percent alumina based on the total weight of the sealing glass composition. In one embodiment, the sealing glass composition comprises about 8 weight percent to about 10 weight percent sodium oxide based on the total weight of the sealing glass composition. In one embodiment, the sealing glass composition comprises about 10 weight percent to about 12 weight percent sodium oxide based on the total weight of the sealing glass composition.

In one embodiment, the sealing glass has about 0 weight percent to about 0.01 weight percent of alkali earth oxides. In one embodiment, the alkali earth oxides include calcium oxide, strontium oxide, or barium oxide.

In one embodiment, since the seal structure used for joining the two ceramic members includes a sealing glass composition consisting of about 48 weight percent silica, about 20 weight percent to about 25 weight percent boria, about 20 weight percent to about 24 weight percent alumina, and about 8 weight percent to about 12 weight percent sodium oxide the corrosion rate due to sodium or the metal halide may be reduced, and thus reliability of the glass joint portion may be improved. Therefore, the life of the sodium-metal halide cell may be prolonged.

In various embodiments, it may be noted that each of the constituent oxides of a sealing glass composition contributes to multiple properties such as thermal expansion, working temperature, and corrosion resistance. In one embodiment, in the seal structure, the reason for limiting the amount of silica to about 48 weight percent is because less than about 48 weight percent silica may result in an increase in thermal expansion coefficient and the resultant residual stress due to the connection may become larger, and thus cracks may be generated when the sealing operation is performed. Further if the amount of silica is more than about 48 weight percent the corrosion rate due to sodium becomes extremely high and thus cracks may be generated in a short time after contact with sodium. Also, high levels of silica can make the working temperature too high. In one embodiment, the reason for limiting the amount of sodium oxide to about 8 weight percent to about 12 weight percent is because less than about 8 weight percent of sodium oxide may result in a decrease in the coefficient of thermal expansion and the resultant residual stress due to the connection may become larger, and cracks may be generated when the sealing operation is performed and more than about 12 weight percent of sodium oxide may result in an increase in the thermal expansion of the sealing materials. The sodium oxides also act to decrease the working temperature with increasing sodium oxide amounts.

In one embodiment, since the sealed structure includes a sealing glass composition consisting of about 48 weight percent silica and about 20 weight percent to about 25 weight percent boria the corrosion rate due to sodium may be retarded thus improving the reliability of the glass joint portion and prolonging the life of the cell. Also about 20 weight percent to about 25 weight percent boria may be required because if the amount of boria is less than about 20 weight percent it may not be possible to generate a glassy state. Further if the amount of boria is greater than about 25 weight percent the seal structure may get easily deteriorated due to absorption of water. In one embodiment, the reason for limiting the amount of alumina to about 20 weight percent to about 24 weight percent is because, if the amount of alumina is more than 24 weight percent, the working temperature may be increased to temperatures greater than 1100 degrees Celsius. With the amount of alumina below about 20 weight percent, the corrosion stability of the sealing structure is limited in the energy storage device.

In one embodiment, the sealing glass can seal an ion-conducting first ceramic and an electrically insulating second ceramic. As used herein the phrase "can seal" means that the ion-conducting first ceramic is bonded and/or secured to the electrically insulating second ceramic using the sealing glass composition. The ion-conducting first ceramic has a first thermal expansion coefficient and the electrically insulating second ceramic has a second thermal expansion coefficient that is different from the first thermal expansion coefficient. In one embodiment, the thermal expansion coefficient of the sealing glass is about the same as the thermal expansion coefficient of the ion-conducting first ceramic. In one embodiment, the thermal expansion coefficient of the sealing glass is about the same as the thermal expansion coefficient of the electrically insulating second ceramic. On the seal structure, the function relates to the ability to secure or bond to a mating surface. With regard to the sealing glass composition, the seal structure includes a sealing glass composition that defines the boundaries of the ion-conducting first ceramic and the electrically insulating second ceramic.

In one embodiment, the sealing glass has a thermal expansion coefficient in a range of from about 5 parts per million per degree Celsius to about 8 parts per million per degree Celsius. In one embodiment, the sealing glass has a thermal expansion coefficient in a range of from about 5.5 parts per million per degree Celsius to about 7.5 parts per million per degree Celsius, from about 6 parts per million per degree Celsius to about 7 parts per million per degree Celsius. In various embodiments, the sealing glass composition may be finely tuned to obtain a close thermal expansion coefficient match with the ceramic parts.

In one embodiment, the sealing glass has a working temperature of greater than about 850 degrees Celsius. In one embodiment, the sealing glass has a working temperature in a range of from about 850 degrees Celsius to about 1050 degrees Celsius. In one embodiment, the sealing glass has a working temperature in a range of from about 900 degrees Celsius to about 1000 degrees Celsius. In one embodiment, the sealing glass has a working temperature in a range of from about 850 degrees Celsius to about 875 degrees Celsius, from about 875 degrees Celsius to about 900 degrees Celsius, from about 900 degrees Celsius to about 925 degrees Celsius, from about 925 degrees Celsius to about 950 degrees Celsius, from about 950 degrees Celsius to about 975 degrees Celsius, or from about 975 degrees Celsius to about 1000 degrees Celsius. As used herein the phrase "working temperature" is defined as the temperature that the metal oxide sealing glass attains during the working or sealing of the seal structure. This corresponds to a temperature where the viscosity of the glass is about $10^4$ poise, and the glass can be freely worked or sealed. In one embodiment, the sealing glass composition resists corrosion or degradation by contact with sodium or metal halides at the cell operating temperature of about 300 degrees Celsius to about 350 degrees Celsius for sodium-metal halide batteries.

In accordance with an embodiment of the invention, a method is provided that is capable of forming a seal structure for an energy storage device. The seal structure includes a sealing glass. The method includes mixing about 48 weight percent silica, about 20 weight percent to about 25 weight percent boria, about 20 weight percent to about 24 weight percent alumina, and about 8 weight percent to about 12 weight percent sodium oxide based on the total weight of a sealing glass composition, balancing the amount of alumina relative to the amount of sodium oxide, and controlling the amount of sodium oxide to form the sealing glass composition. It should be noted that precursors of the metal oxides may also be employed to prepare the sealing glass composition; for example, sodium bicarbonate may be used as a precursor to form sodium oxide.

In one embodiment, a method for making the sealing glass composition for a sodium-metal halide cell may include blending silica, boria, alumina, and sodium oxide or precursors of silica, boria, alumina and sodium oxide, and melting the oxides to form a homogenous composition. In one embodiment, the oxides are melted at a temperature in a range from about 1300 degrees Celsius to about 1700 degrees Celsius. The molten glass is then cooled to prepare a homogenous sealing glass composition. In one embodiment, the molten glass is cooled at room temperature. In another embodiment, the molten glass composition is quenched between stainless steel plates at room temperature with the resulting glass mass being crushed to predetermined particle sizes to form a frit glass powder for sealing of the ceramic parts.

The sealing glass in the form of frit glass powder may be placed between the ion-conducting first ceramic and the electrically insulating second ceramic. The resultant assembly may be heated to the working temperature to form a viscous molten sealing glass. On cooling the assembly the ion-conducting first ceramic is bonded to the electrically insulating second ceramic by forming a seal structure between the ion-conducting first ceramic and the electrically insulating second ceramic. The seal structure may be in the form of a seal ring made of a glassy phase of sealing glass. In one embodiment, the seal structure joins or bounds the parts to be joined. Binding occurs where two or more pieces of bondable material are bonded together by liquefying a composition placed between the two or more pieces of bondable material at the region where they are to be bonded and allowing the liquid to solidify. At the end of the binding process the two pieces have become one continuous solid.

The ion-conducting first ceramic and the electrically insulating second ceramic can be defined by composition and/or function. The ion-conducting first ceramic and the electrically insulating second ceramic may be of different compositions. In one embodiment, the ion-conducting first ceramic includes a beta-alumina tube, plate or other structure with a suitable geometry.

The electrically insulating second ceramic may physically separate the anodic material from the cathodic material. The electrically insulating second ceramic may include or be formed from an electrically insulating material. Suitable material for use as electrically insulating material may include alpha-alumina. The dielectric strength of the material in the electrically insulating second ceramic is greater than the voltage or current potential differential between the anode and cathode material. If a lower dielectric constant material is used, the width of the electrically insulating second ceramic may be selected to be larger—and the reverse configuration is available. In one embodiment, the ion-conducting first ceramic includes a beta-alumina tube and the electrically insulating second ceramic includes an alpha-alumina plate and the sealing glass is designed to join and seal the beta-alumina tube with the alpha-alumina plate.

Referring to FIG. 1 a schematic view shows one embodiment of a glass joint body 100 in accordance with the present invention. FIG. 1 includes a beta alumina tube 110 functioning as the ion-conducting first ceramic, an outer metal container functioning as an anode 112, sodium 114 in the outer metal container, a metal rod functioning as a cathode 116, the metal rod surrounded by metal halides 118 a positive electrode material, an alpha-alumina plate 120 functioning as the electrically insulating second ceramic, and a sealing glass 122 for sealing the beta alumina tube and the alpha alumina plate.

For example, if the above cell is a sodium-metal halide cell, method for manufacturing the above described cell generally comprises the steps of: bonding the open end periphery of the beta alumina tube with the electrically insulating second ceramic in the form of an insulator ring made of alpha-alumina by means of the sealing glass, bonding the insulator ring supporting the beta alumina tube with the metal containers functioning as the anode and the cathode by a solid phase reaction or the like at a high temperature under pressure, supplying the sodium and the metal halides into the anode metal container and the cathode metal container respectively, and hermetically closing the metal containers with the metal lids by means of welding to provide a cell.

In the cells mentioned above, the sealing material is arranged between the beta alumina tube and the insulator ring made of alpha-alumina. The alumina material is capable of being corroded by the sodium, and consequently the life of the cell is decreased. In one embodiment, the sealing glass disclosed above has good durability against sodium corrosion. Further, while relating specifically to the illustrated embodiment, the seal structure contacts and secures the joint between the beta-alumina tube and the alpha-alumina insulator ring. In this configuration, the sealing glass is selected to be electrically insulative and chemically resistant to sodium and metal halides in the operating environment. Other considerations, such as working temperature, glass transition temperature and thermal expansion coefficient may be taken into account for sealing glass selection.

In accordance with an embodiment of the invention, an article is provided that includes a seal structure for use in an energy storage device. The article includes an ion-conducting first ceramic and an electrically insulating second ceramic connected by a seal structure. The seal structure includes a sealing glass. The sealing glass has a composition that includes about 48 weight percent silica, about 20 weight percent to about 25 weight percent boria, about 20 weight percent to about 24 weight percent alumina, and about 8 weight percent to about 12 weight percent sodium oxide. In one embodiment, the article is an energy storage device, such as for example, an electrochemical cell.

EXAMPLES

The following examples illustrate methods and embodiments in accordance with the invention, and as such should not be construed as imposing limitations upon the claims. Unless specified otherwise, all components are commercially available from common chemical suppliers such as Sigma-Aldrich (United States), and the like.

Example 1

Preparation of Sealing Glass

Silica, boria, alumina, and sodium oxide are blended and melted to form a homogenous composition. The oxides are melted at about 1400 degrees Celsius. The resultant molten glass is quenched between steel plates at room temperature with the resulting solid glass being crushed to predetermined particle sizes to form a frit glass powder. The glass powder is placed between the beta alumina tube and the insular ring and the resultant assembly heated to about 1100 degrees Celsius for sealing of the ceramic parts. The sealing glass composition according to this formula can be finely tuned to meet a close thermal expansion coefficient match with the ceramic parts. The amount of silica, boria, alumina, and sodium oxide in weight percent in the glass compositions prepared in Example 1 are provided in Table 1 below. The sealing glass compositions disclosed herein may make it possible to construct a high power density or high energy density battery having a long life time.

TABLE 1

| Composition | Composition 1 | Composition 2 | Composition 3 |
|---|---|---|---|
| Silica | 48 | 48 | 48 |
| Boria | 20 | 20 | 20 |
| Alumina | 24 | 22 | 20 |
| Sodium oxide | 8 | 10 | 12 |

The properties of the glass compositions provided in Table 1 were calculated using the SciGlass software (version 6.5). The properties are listed in Table 2.

TABLE 2

| Properties | Composition 1 | Composition 2 | Composition 3 |
|---|---|---|---|
| Co-efficient of thermal epansion ($E^{-6}$ Kelvin$^{-1}$) | 5.131 | 5.96 | 6.776 |
| Young's Modulus (giga Pascals) | 50.34 | 54.66 | 58.71 |
| Shear Modulus (giga Pascals) | 19.68 | 21.33 | 22.94 |
| Density (grams per cubic centimeter) | 2.309 | 2.393 | 2.401 |
| Glass tranisition temperature (Tg; degrees Celsius) | 611.8 | 605.1 | 605.7 |
| Working Temperature (degrees Celsius) | 945.7 | 913.2 | 888.3 |
| Weight loss after exposure to halide at 350 degrees Celsius for one week (weight percent) | 0.141 | 0.078 | 0.046 |

The results provided in Table 2 show that the sealing glass compositions 1, 2 and 3, prepared in accordance with the present invention may have a working temperature of greater than about 850 degrees Celsius. Also these compositions exhibit a weight loss of about 0.046 weight percent to about 0.141 weight percent after exposure to halides at about 350 degrees Celsius for one week, in comparison to some sealing glasses that are known to show a weight loss of greater than about 2 weight percent after the same exposure.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal structure, comprising:
a sealing glass joining an ion-conducting first ceramic to an electrically insulating second ceramic, and the sealing glass having a composition comprising about 48 weight percent silica, about 20 weight percent to about 25 weight percent boria, about 20 weight percent to about 24 weight percent alumina, and about 8 weight percent to about 12 weight percent sodium oxide.

2. The seal structure as defined in claim 1, wherein the sealing glass has a thermal expansion coefficient in a range of from about 5.1 parts per million per degrees Centigrade to about 7.5 parts per million per degrees Centigrade.

3. The seal structure as defined in claim 1, wherein the sealing glass comprises about 20 weight percent to about 22 weight percent alumina based on the total weight of the sealing glass composition.

4. The seal structure as defined in claim 1, wherein the sealing glass comprises about 22 weight percent to about 24 weight percent alumina based on the total weight of the sealing glass composition.

5. The seal structure as defined in claim 1, wherein the sealing glass comprises about 8 weight percent to about 10 weight percent sodium oxide based on the total weight of the sealing glass composition.

6. The seal structure as defined in claim 1, wherein the sealing glass comprises about 10 weight percent to about 12 weight percent sodium oxide based on the total weight of the sealing glass composition.

7. The seal structure as defined in claim 1, wherein the sealing glass can seal the ion-conducting first ceramic having a first thermal expansion coefficient and the electrically insulating second ceramic having a second thermal expansion coefficient that is different from the first thermal expansion coefficient.

8. The seal structure as defined in claim 7, wherein the thermal expansion coefficient of the sealing glass is about the same as a thermal expansion coefficient of the ion-conducting first ceramic.

9. The seal structure as defined in claim 7, wherein the thermal expansion coefficient of the sealing glass is about the same as a thermal expansion coefficient of the electrically insulating second ceramic.

10. The seal structure as defined in claim 1, wherein the sealing glass has a working temperature of greater than about 850 degrees Celsius.

11. The seal structure as defined in claim 1, wherein the sealing glass has a working temperature in a range of from about 850 degrees Celsius to about 1000 degrees Celsius.

12. The seal structure as defined in claim 1, wherein the sealing glass has a working temperature in a range of from about 875 degrees Celsius to about 975 degrees Celsius.

13. The seal structure as defined in claim 1, wherein the sealing glass resists corrosion or degradation by contact with sodium or metal halides at a working temperature.

14. The seal structure as defined in claim 1, wherein the sealing glass has about 0 weight percent to about 0.01 weight percent of alkali earth oxides.

15. The seal structure as defined in claim 1, wherein the alkali earth oxides comprise calcium oxide, strontium oxide, or barium oxide.

16. An article, comprising:
an ion-conducting first ceramic and an electrically insulating second ceramic connected by a seal structure, the seal structure comprising a sealing glass;
the sealing glass having a composition comprising about 48 weight percent silica, about 20 weight percent to about 25 weight percent boria, about 20 weight percent to about 24 weight percent alumina, and about 8 weight percent to about 12 weight percent sodium oxide based on the total weight of the sealing glass.

17. The article as defined in claim 16, wherein the sealing glass has a thermal expansion coefficient in a range of from about 5.1 parts per million per degrees Centigrade to about 7.5 parts per million per degrees Centigrade.

18. The article as defined in claim 16, wherein the sealing glass has a working temperature of greater than about 850degrees Celsius.

19. The article as defined in claim 16, wherein the sealing glass can seal the ion-conducting first ceramic having a first thermal expansion coefficient and the electrically insulating second ceramic having a second thermal expansion coefficient that is different from the first thermal expansion coefficient.

20. The article as defined in claim 16, wherein the thermal expansion coefficient of the sealing glass is about the same as a thermal expansion coefficient of the ion-conducting first ceramic.

21. The article as defined in claim 16, wherein the thermal expansion coefficient of the sealing glass is about the same as a thermal expansion coefficient of the electrically insulating second ceramic.

22. The article as defined in claim 16, wherein the sealing glass has about 0 weight percent to about 0.01 weight percent of alkali earth oxides.

* * * * *